United States Patent [19]

Zwirlein

[11] 4,204,977
[45] May 27, 1980

[54] POLYURETHANE FOAM GENERATING APPARATUS

[75] Inventor: John F. Zwirlein, New Haven, Conn.

[73] Assignee: Olin Corporation, New Haven, Conn.

[21] Appl. No.: 866,976

[22] Filed: Jan. 5, 1978

Related U.S. Application Data

[63] Continuation of Ser. No. 656,157, Feb. 9, 1976, abandoned.

[51] Int. Cl.$^2$ .......................... B01F 3/04; B05B 15/02
[52] U.S. Cl. ................... 252/359 E; 239/112; 239/413; 239/343; 134/34
[58] Field of Search ................. 134/34, 37, 22 R, 23; 239/106, 112, 113, 119, 413, 343; 252/359

[56] References Cited

U.S. PATENT DOCUMENTS

| | | | |
|---|---|---|---|
| 3,179,341 | 4/1965 | Plos et al. | 239/106 |
| 3,348,774 | 10/1967 | Wiggins | 239/112 |
| 3,382,886 | 5/1968 | Hesselmann | 239/112 |
| 3,541,023 | 11/1970 | Cole | 252/359 E |
| 3,752,398 | 8/1973 | Svensson | 134/18 |
| 3,769,232 | 10/1973 | Houldridge | 252/359 E |
| 3,790,030 | 2/1974 | Ives | 239/112 |

Primary Examiner—Norman Yudkoff
Attorney, Agent, or Firm—Bruce E. Burdick; Thomas P. O'Day

[57] ABSTRACT

An improvement in an on-site foam generating apparatus which includes storage tanks for supplying the foam-forming reactants, a mixing chamber, and means for conveying the reactants through the mixing chamber. The improvement comprises means for cleaning the mixing chamber including a solvent storage tank and means for recovering the solvent within the apparatus and recycling the solvent through the chamber.

12 Claims, 4 Drawing Figures

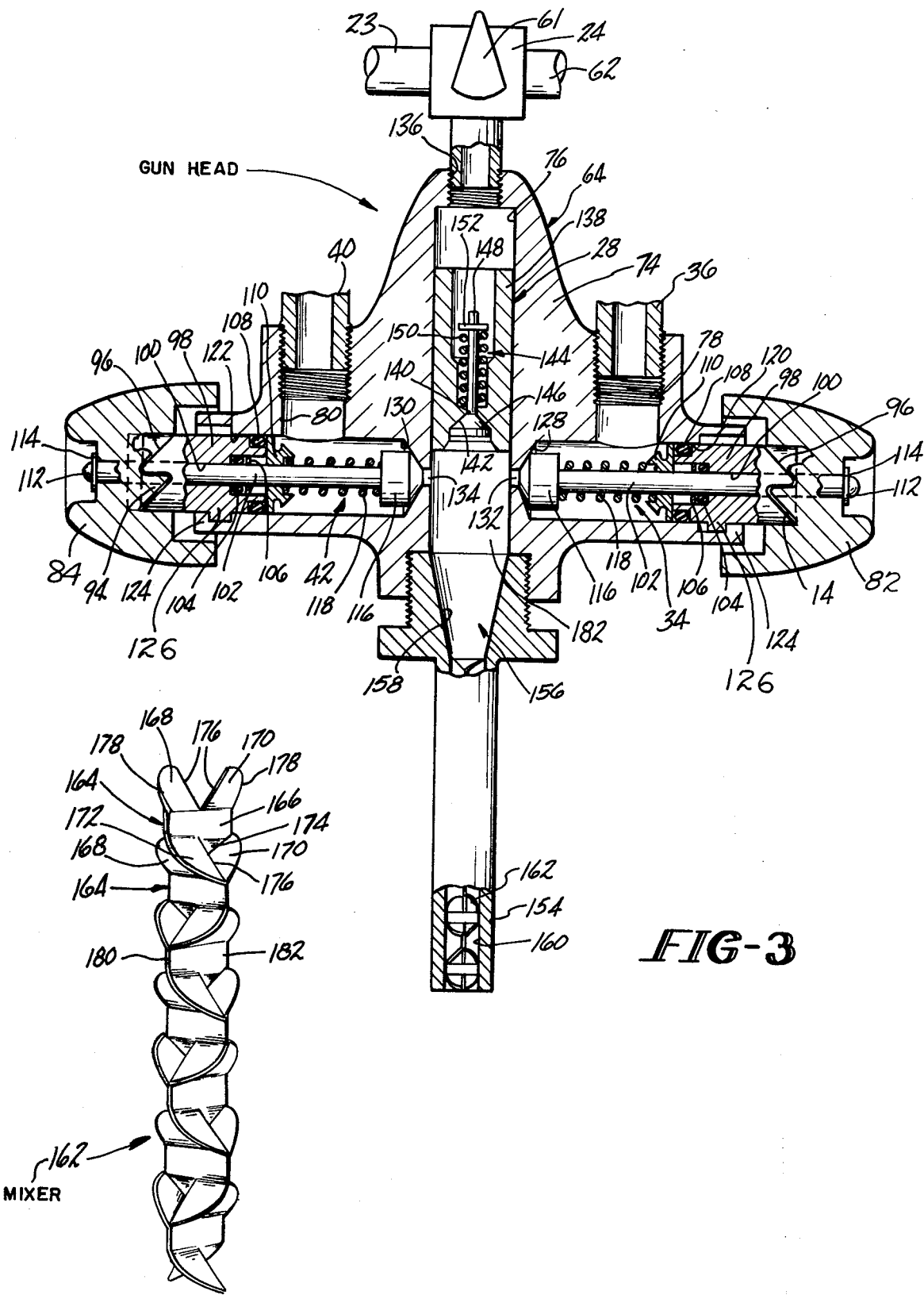

POLYURETHANE FOAM GENERATING APPARATUS

This is a continuation of application Ser. No. 656,157, filed Feb. 9, 1976 now abandoned.

BACKGROUND OF THE INVENTION

This invention relates to an apparatus for the on-site generation of polyurethane foam. More particularly, this invention relates to an apparatus of this type having improved means for cleaning the mixing chamber thereof.

Several portable apparatus have been disclosed in the art for the generation of polyurethane foam. See, for example, U.S. Pat. No. 3,178,157, issued to Cole on Apr. 3, 1965; U.S. Pat. No. 3,541,023, which issued Nov. 17, 1970, to Cole; and U.S. Pat. No. 3,769,232, which issued Oct. 30, 1973, to Houldridge. Apparatus of this type usually includes two storage tanks for supplying two inter-reactive polyurethanefoaming materials, means for imposing a gas pressure in these tanks to expell the reactants therefrom and a mixing chamber having an outlet and two valved inlets for mixing the reactants before they are dispensed as a foaming mixture from the mixing chamber. These prior art apparatus permit dispensing of polyurethane foam on site for use in an increasing number of applications, such as making molded foam insulation, furniture parts, structural elements, packaging, and so forth.

It has been found desirable to periodically flush the mixing chamber with a suitable solvent to clean the mixing chamber and remove any material which has accumulated therein. Build-up of material could result in improper mixing, poor flow characteristics, and improper ratio of ingredients, all of which could affect the quality of foam produced.

For the purpose of cleaning the mixing chamber, the apparatus may include a solvent tank which is connected to the mixing chamber to provide a supply of solvent for flushing purposes. Such arrangement is shown, for example, in previously mentioned U.S. Pat. Nos. 3,769,232 and 3,541,023.

During the flushing operation of previously known apparatus, solvent is expelled onto the floor or ground or into a separate container. This results in a waste of solvent and increased expense. In addition, if the solvent is expelled directly onto the floor or ground it presents an ecological problem as the solvent constitutes a pollutant.

In view of the above, it is an object of the present invention to provide an improved foam generating apparatus wherein the solvent used for flushing the mixing chamber is recovered.

An improved object of the present invention is to provide an improved foam generating apparatus wherein the solvent used for flushing the mixing chamber is recycled.

According to the invention, the apparatus includes first and second reactant storage tanks which are connected to the mixing chamber through mixing chamber inlet valves. A solvent tank is provided having an inlet and an outlet. The solvent tank is connected to a pump which is in turn connected to the mixing chamber through an inlet valve. The tank is so arranged that the discharge from the mixing chamber can be returned to the solvent tank through the inlet thereof and continuous recycling of the solvent through the mixing chamber can take place when desired.

DESCRIPTION OF THE DRAWINGS

The present invention may be more readily understood by reference to the following detailed description and to the drawings, in which:

FIG. 3 is a horizontal sectional view taken along the lines 3—3 of FIG. 2; and

FIG. 4 is an illustration of a preferred foam of a static mixer for use in connection with the form gun head of FIGS. 2 and 3.

DETAILED DESCRIPTION

Figure 1:
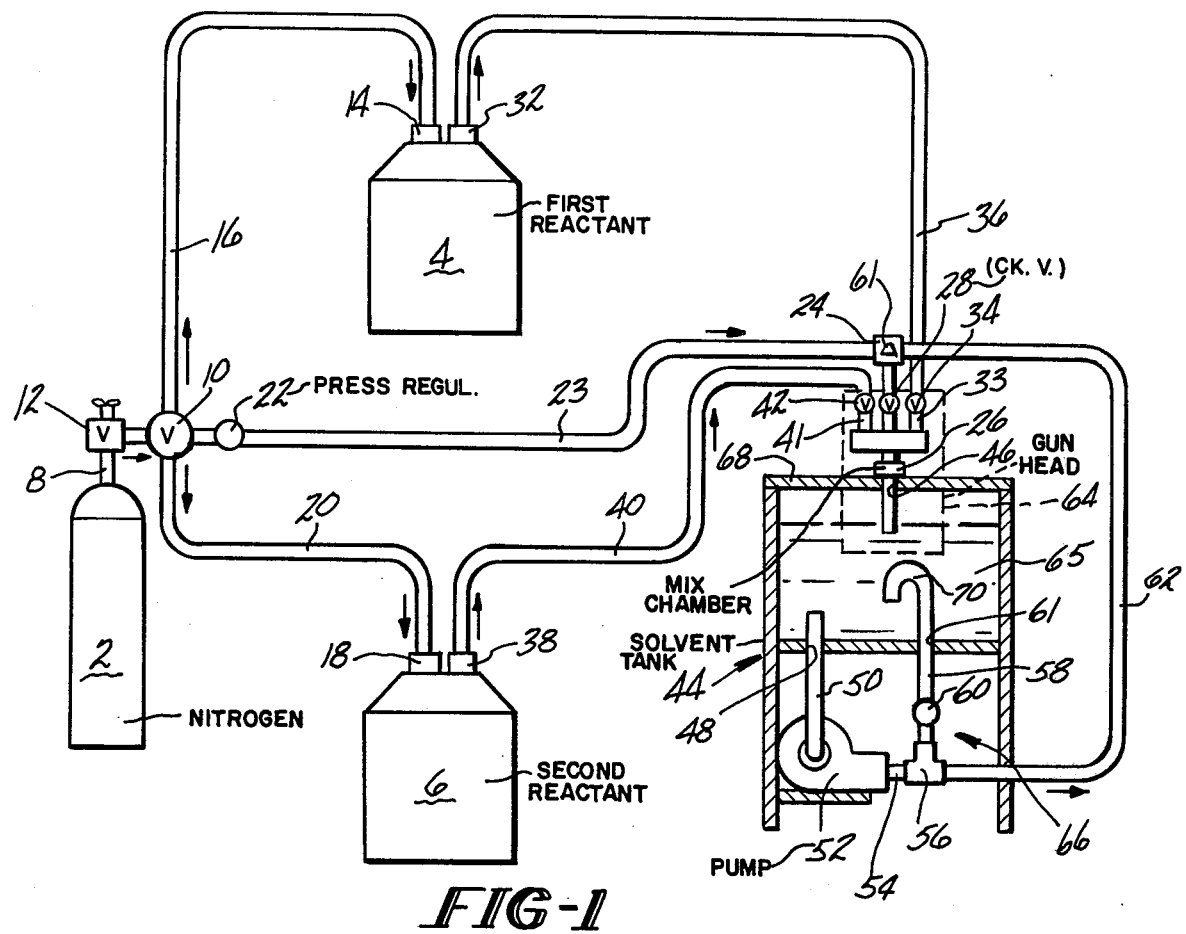
FIG. 1 is a schematic illustration of preferred apparatus used in practicing the present invention.

The apparatus shown in FIG. 1 generally includes a nitrogen tank 2 which is used to pressurize a first reactant storage tank 4 and a second reactant storage tank 6. The nitrogen tank 2 has an outlet 8 connected to a high pressure regulating valve 10 through a shut-off valve 12. The high pressure regulating valve 10 has three outlets, one of which is connected to the inlet 14 of the first reactant storage tank 4 by suitable connecting line 16. The second outlet is connected to the inlet 18 of the second reactant storage tank 6 by means of a connecting line 20. The third outlet is connected to a low pressure regulator 22, the outlet of which is connected by a suitable connecting line 23 to the first inlet of operating valve 24. The outlet of operating valve 24 is connected to a reactant mixing chamber 26 through a check valve 28.

The first reactant storage tank 4 has an outlet 32 which is connected to a first inlet 33 of the mixing chamber 26 through an inlet valve 34 by connecting line 36. The second reactant storage tank 6 has an outlet 38, which is connected by means of a connecting line 40 to a second inlet 41 of the mixing chamber 26 through a valve 42.

A solvent storage tank 4 is provided having an inlet 46 and an outlet 48. The outlet is connected by a suitable outlet pipe 50 to a pump 52, which has its outlet 54 connected to a T-connector 56. One outlet of the connector 56 is connected to a return pipe 58 through a check valve 61. The return pipe 58 extends into the solvent storage tank 44 through a return inlet 70. The other outlet of the connector 56 is connected by suitable connecting hose 62 to a second inlet in operating valve 24.

More in detail, the nitrogen tank 2 is a conventional nitrogen gas tank used to impose a sealed gas pressure on the interiors of reactant storage tanks 4 and 6. While other means can be used to impose gas pressure on the reactant storage tanks to expell the materials therefrom, the use of nitrogen is preferred. A conventional high pressure regulating valve 10 is conveniently used to distribute nitrogen gas among the tanks 4 and 6 as well as to the mixing chamber 26.

The nitrogen gas pressure imposed upon the reactants in the reactant storage tanks 4 and 6 forces the inter-reacting material through outlets 32 and 38 into lines 36 and 40 for delivery to the mixing chamber 26. Entry of these materials into the mixing chamber 26 is effected by opening the mixing chamber inlet valves 34 and 42.

The valve 24 may be a conventional two inlet, one outlet, three position valve which can be operated by a manual control 61. The valve 24 has three positions, a first off position wherein the outlet is closed, a second position wherein the nitrogen line 30 is connected to the outlet, and a third position wherein the solvent line 62 is connected to the outlet. The check valve 28 may be of any conventional type and preferably comprises a spring based poppet valve.

The mixing chamber 26, inlets 33 and 41, inlet valves 34 and 42, and check valve 28 may be incorporated into an assembly commonly referred to as a foam gun head 64. The operating valve 24 may be incorporated into the body of the foam gun head or attached to the body. However, it may be considered a part of the foam gun head 64. The mixing chamber 26 preferably includes a static mixer to effect proper mixing of the reactant materials.

The solvent storage tank 44 is preferably in the form of a console having an enclosed chamber 65 for holding a suitable solvent and a lower portion 66 for housing the pump 52. The top of the storage tank 44 may constitute a lid member 68 capable of being removed to facilitate the filling of the solvent chamber 65. The lid 68 is provided with an opening forming the inlet 46 to receive a portion of the foam gun head 64 for return of solvent to the chamber 65. The bottom of chamber 65 is provided with an opening forming the outlet 48 through which the solvent outlet pipe 50 extends. A second opening in the bottom forms the return inlet 61 through which the return piping 58 extends. The return piping 58 extends partially into the solvent tank and terminates in a U-bend 70 so that the discharge therefrom is in a downward direction.

Figure 2:
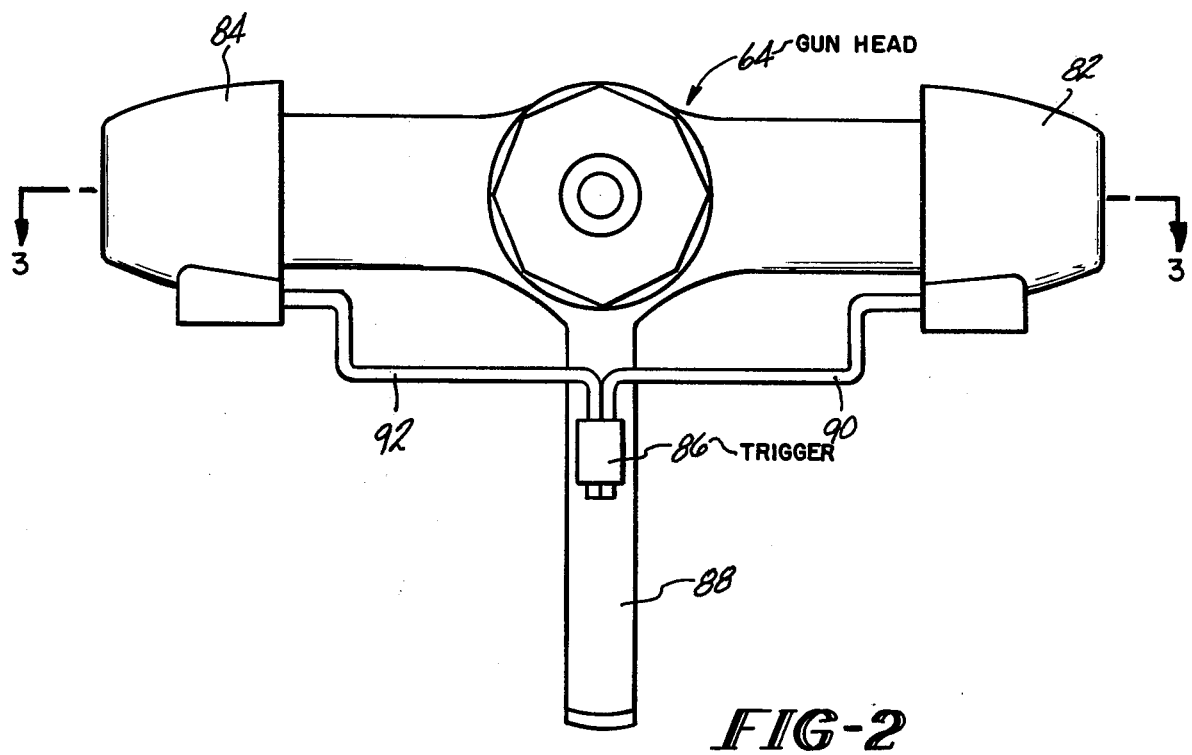
FIG. 2 is a front elevational view of a foam gun head adapted for use with the apparatus shown in FIG. 1.

A preferred form of a foam gun head 64 capable of use in connection with the apparatus shown in FIG. 1 is shown in FIGS. 2 and 3. The foam gun head 64 shown in these Figures is similar to the foam gun head shown in U.S. Pat. No. 3,409,044, which issued to Sobek, et al on Nov. 5, 1968. Reference should be made to that patent for a more detailed explanation of the common features.

The foam gun head 64 includes a main gun body 74 having a cylindrical central passage 76 and a cylindrical first and second inlet passages 78 and 80 which have an axis parallel to but offset to either side of the axis of passage 76. The inlet passages 78 and 80 are arranged to be placed in communication with the central passage 76 by the first and second inlet valves 34 and 42. Valve actuators 82 and 84 actuate the valves 34 and 42 and are operated simultaneously by a trigger 86 and associated pistol grip structure 88 through connecting links 90 and 92. The arrangement is such that the gun may be held in one hand and the valve actuators 82 and 84 operated simultaneously by the trigger 86.

Each of the valve actuators 82 and 84 includes a recessed interior portion having a circumferentially disposed cam follower surface portion 94. These cam follower surfaces 94 in turn are arranged to cooperate with cam surfaces 96 formed on one end of a valve body 98. Each valve body 98 includes a central bore 100 arranged to receive an elongated valve stem 102. To provide a proper sealing relationship between the valve body 98 and valve stem 102, there is provided an inner O-ring 104 and washer 106. The outer seal between the valve body 98 and a portion of a side bore opening in the gun body 74 is in turn affected by an outer O-ring 108 and backing plate 110.

The outer end of each valve stem 102 includes an annular groove 112 adapted to receive a snap ring 114 after the stem 102 has been passed through the central bore 100 in the valve body 98 and the actuator 82 and 84. This snap ring 114 secures the valve stem 100 to the valve actuator 82 or 84 axial movement therewith. The inner end of each valve stem 102 terminates in an enlarged valve head structure including a valve head 116. A valve head biasing spring 118 extends between the backing plate 110 and the head 116 to bias the valve head 116 against the valve seat.

The gun body 74 is provided with side bore openings 120 and 122 in which a valve body 98 is mounted. Each of the openings 120 and 122 includes inwardly extending projections 124 which cooperate with suitable projections 126 on each valve body 98 to form a bayonet connection between the valve body 98 and gun body 74. The inner end of the side bore openings 120 and 122 forms the valve seating surfaces 128 and 130. The valve seating surfaces 128 and 130 are provided with an opening 132 and 134, respectively which provides communications between the inlets 78 and 80 and the central passage 76. The openings 132 and 134 correspond to the inlets 33 and 41 described in connection with FIG. 1.

The rear portion of the gun body 74 includes an inlet 136 in communication with the central passage 76. Positioned in central passage 76 between the inlet 132 and the nozzle 128 is the check valve 28. The check valve 28 includes a valve housing 138 having an opening 140 therethrough surrounded by a tapered valve seat 142. The valve housing 138 is press-fit or otherwise secured within the central passage 76 of the gun body 74. A valve member 144 having a flared head 146 and an elongated stem portion 148 is mounted within the valve housing 138. A spring member 150 biases the valve into its closed position. A snap ring 152 attached to the valve stem 148 provides an abutment for the spring 150 as well as a stop to limit the opening of the valve. It is to be noted that the check valve 28 is provided in the central passage 76 at a point slightly to the rear of the inlet openings 132 and 134.

The operating valve 24 has its outlet connected to the inlet 136 in the gun body 74 by suitable connections such as male and female conforming threads on the outlet of valve 24 and in inlet 136, respectively. As shown, the operating valve 24 is positioned immediately to the rear of the foam gun head 64.

A tubular nozzle member 154 is threadedly attached to the forward end of gun body 74. The nozzle member 154 includes a bore 156 therethrough which is co-axial with and in communication with the central passage 76 in the gun body 74. The bore 156 includes a forwardly tapered frustoconical rearward portion 158 and a succeeding forward reduced cylindrical portion 160. Portion 158 tapers forwardly and inwardly from a diameter substantially equal to the diameter of the central passage 76 to a diameter substantially equal to the diameter of the forward reduced portion 160.

A static mixer 162 may be mounted in the reduced portion 160 of the bore 156 of the nozzle member 154. The static mixer helps to effect a mixing of the materials without any moving parts. Any suitable static mixer may be used such as disclosed, for example, in U.S. Pat. No. 3,286,922, issued Nov. 22, 1966, to Armeniades et al and U.S. Pat. No. 3,361,412, issued Jan. 2, 1968, to Cole. The preferred form of the static mixer as shown in FIG. 4 is known as a Komax mixer and is manufactured by Komax System, Inc. of Carson, California.

In general, the Komax mixer consists of a plurality of similarly shaped elements 164 rotated 90° placed end to end with each element rotated 90° from its adjacent element. Each element includes a flat planar section 166 and four ears 168, 170, 172 and 174. Two ears 168 and 170 are bent from one edge of the planar section in opposite direction so that each lies in a plane extending at an obtuse angle with respect to the plane of the planar section 166. The two ears 172 and 174 are both bent from the opposite edge of the planar section 166 in opposite directions with ears 168, 172 and ears 170, 174 which are opposite each other cross the planar section 166 extending in opposite directions.

Each ear has an interior side edge 176 which is generally straight, and an outer side edge 178 which is generally arcuate to follow the curvature of the bore in which it is mounted.

A plurality of elements 164 are placed end to end with the planar section 166 of adjacent elements being rotated 90°. The elements are pushed together as shown in FIG. 4 so that the ears 172 and 174 of one element lie above and below the ears 168 and 170 on the adjacent element. When mounted in the bore of the nozzle member 154, the arcuate edges 178 of each of the ears 168, 170, 172, and 174 as well as the opposite straight side edges 180 and 182 of the planar section are substantially in contact with the wall of the bore. There a series of such elements 164 form cavities in the nozzle member producing a number of divisions of the material stream. Each element also generates radial forces which results in migration of the material from the center of the wall of the bore and back again.

Referring to FIGS. 2 and 3, operation of the valves 34 and 42 of the foam gun head 64 is effected by movement of the trigger member 86. Movement of the trigger member 86 causes limited simultaneous rotation of the valve actuators 82 and 84 about their axis. In so doing, the interaction of cam surfaces 94 and 96 causes each of the valve actuators 82 and 84 and their associated valve stems 102 to move outwardly away from the central passage 76 causing unseating of the valve head 116 and opening of the inlets 132 and 134.

For the purpose of the description of this invention, the forward portion 182 of the central passageway 76, downstream of check valve 28, along with the bore 160 of the nozzle member 154, including the portion containing the static mixer 132, may be considered the mixing chamber 26. Most of the mixing will be effected in the bore of the nozzle 154 as the reactants pass through the static mixer.

Generally, polyurethane foam is produced, using the one-slot or the pre-polymer technique, by the reaction of a polyol with an organic polyisocyanate in the presence of a reaction catalyst and a foaming agent. Any known foam-forming formulation may be generated by, and dispersed from the apparatus of the present invention. The polyol reactant may be any such material having at least 2 active hydrogens as determined by the Zerewitinoff method, such as described, for example, in U.S. Pat. No. 3,167,528, issued Jan. 26, 1965, to Kaiser et al. Similarly, any organic isocyanate containing at least two NCO groups may be utilized in preparing the foam. Illustrative polyisocyanates include toluene diisocyanates and the polymeric isocyanates such as disclosed in U.S. Pat. No. 2,683,730, issued July 13, 1954, to Seeger et al. The foaming agent may be any one of those known in the art to be useful for such purpose such as water, an organic foaming agent, or a mixture of at least two foaming agents. Illustrative organic foaming agents are disclosed in U.S. Pat. No. 3,072,582, which issued Jan. 8, 1963, to Frost. Any catalyst or mixture of catalysts known to be useful in making polyurethane foam may be employed such as disclosed, for example, in U.S. Pat. No. 3,397,158, issued to Britain et al, on Aug. 13, 1968.

In utilizing the apparatus of the present invention, a first reactant material comprising a polyol is placed in one of the reactant storage tanks, for example, the first reactant storage tank 4. Conveniently, a reactant catalyst may also be included in this tank. In another reactant storage tank, the reactant storage tank 6, an organic polyisocyanate or a polyisocyanate polyol pre-polymer is placed. The foaming agent may be supplied from a third storage tank or, as is preferred, the foaming agent may be included in at least one and preferably both of reactant storage tanks 4 and 6.

A suitable solvent for the reactant materials is placed in the chamber 65 of the solvent storage tank 44. Such solvent may be methylene chloride, 1,1,1-trichlorethane, or any other solvent suitable for the purpose.

When the shut-off valve 12 of the nitrogen tank 2 is opened, nitrogen will flow through the high pressure regulator 10 to first and second reaction storage tanks 4 and 6. The high pressure regulator 10 preferably maintain the pressure in lines 16 and 20 constant at about 250 psig. The low pressure regulator 22 reduces the pressure of the nitrogen coming from the high pressure regulator 10. The pressure on line 23 is preferably maintained at about 80–100 psig.

Preferably, the pump 52 for the solvent is kept running during the day's operation thereby circulating solvent continuously through return pipe 58 and, when valve 25 is in the third position wherein the solvent line 62 is in fluid communication with passageway 76, also circulating solvent through passageway 76, past valve 146 and through mixing chamber 26. The foam gun head 64 is normally stored between shots, preferably in a vertical downward pointing position with nozzle member 154 pointing vertically downward into the interior of solvent tank 44 to minimize escape or backflow of solvent through inlet 46. Rearward portion 158 of nozzle member 158 is preferably flanged (see FIGS. 1 and 3) to provide a flat horizontal surface adapted to rest atop that portion of lid member 68 immediately surrounding inlet 46 such flange inherently minimizing undesired escape or backflow of solvent through inlet 46. Thus, nozzle member 154 can rest between shots on the solvent tank 44 with the nozzle member 154 extending into the inlet 46. When the foam gun head is being stored between shots on the solvent tank 44, valve 24 should be placed in said third position to permit solvent to flow through check valve 28 and exit from nozzle member 154 into the solvent storage compartment 65. This permits continuous recycling of the solvent through the mixing chamber 26, thereby providing continuous cleaning of nozzle 154 between "shots". Also, the continuous circulation through valve 60, pipes 50 and 58 and downwardly from U-bend 70 and into solvent tank 65 results in continuous agitation of the solvent within tank 65 so as to reduce build up of material in outlet pipe 50 and solvent tank 65 which built up material might be otherwise introduced to mixing chamber 26 during recycling of solvent, thus perhaps undesirably clogging mixing chamber 26.

According to the preferred embodiment, the pump discharge pressure is about 15 psig. The operating pressure of the check valve 60 in the solvent return line is about 12 psig and the operating pressure of the check valve 28 in the foam gun head is about 10 psig. These pressures are relative, and may be varied within reasonable design parameters. However, the operating pressure of check valve 60 should be greater than that of the check valve 28, but less than the pump discharge pressure. This ensures that when valve 24 is opened to solvent flow, a suitable supply of solvent will flow through the check valve 28 and mixing chamber 26 rather than the majority being recycled back into the solvent storage compartment through return line 58.

When it is desired to generate foam, the operator can move manual control 61 such that valve 24 is in the first position, above described, thereby blocking the flow of solvent from line 62 to passageway 26 and mixing chamber 26 and remove the foam gun head 64 from the inlet 46 of the solvent storage tank 44 and carry it to the location where the foam is desired. Upon actuation of the trigger member 86, which simultaneously opens valves 34 and 42, the reactants will flow into the forward portion of the central passage 76 in the foam gun and into the bore in the nozzle 154 which may be provided with the static mixer 162. As the reactants travel through the mixing chamber, the reactants become fully admixed together and begin to froth, exiting from the end of nozzle 128 as a partially expanded material which continues to expand outside the chamber to its full free-rise volume. Release of the trigger member 86 closes valves 34 and 42, shutting off the supply of reactant to the mixing chamber.

After each shot, in order to rid the mixing chamber 26 of excess reactant material, it is preferred to actuate valve 24 to provide a blast of gas to expell as much of the remaining reactant material as possible. Valve 24 should be opened to permit flow of the gas from conduit 23 into the mixing chamber 26, through check valve assembly 134, and exiting from nozzle 154. Though according to the preferred form of the invention, the gas used for this purpose comes from the nitrogen tank 2 used to pressurize the first and second reactant storage tanks 4 and 6, other suitable gas supplies may be used as, for example, compressed air from a readily available source.

When the gas to the foam gun head is provided from the nitrogen storage tank 2 used to pressurize the reactant storage tanks 4 and 6, the pressure of the gas flowing to the foam gun head is reduced from the pressure flowing to the storage tanks 4 and 6 as explained above. In order to provide proper flow to the reactant materials, in tanks 4 and 6 a relatively high pressure, is needed because of the relatively high viscosity of the materials. By reducing the pressure of the gas flowing to the foam gun, substantial damage to the check valve 28 which might occur if the gas were under relatively high pressure is minimized.

After executing the blast of gas, the gun head 64 may be returned to the solvent storage tank 44 with the nozzle 154 thereof extending through the inlet 46. At this point, valve 24 may be opened to permit solvent to flow through the solvent inlet conduit into central passage 76 in the gun head, through the check valve 28, and through the bore 160 of nozzle 154. It is preferred that the valve 24 remain in this position so long as the gun head is not being used for the generation of foam. A continuous stream of solvent will then pass through the mixing chamber 26 to continuously flush the gun head 64. When it is desired to again generate foam, the operator merely has to shut off valve 24 and remove the gun head 64 from its position on the solvent storage tank 44.

By virtue of the described arrangement, the solvent utilized in flushing the mixing chamber of a foam generating apparatus is continuously recycled through the mixing chamber when the foam gun is at rest. This insures maximum cleaning of the mixing chamber, preventing undesirable build-up of the reactant material therein. In addition, there is no waste of solvent nor is there any discharge of solvent outside of the system.

What is claimed is:

1. A foam generating apparatus wherein first and second inter-reactive foam-forming materials are mixed and foam generated therefrom and the generated foam is dispensed through an outlet, which apparatus comprises:
   (a) first tank means, having an outlet, for providing a supply of said first material;
   (b) second tank means, having an outlet, for providing a supply of said second material;
   (c) first, second and third inlet valves;
   (d) mixing chamber means, having an inlet and an outlet for mixing said first and second materials to generate foam and dispensing said generated foam through said mixing chamber outlet;
   (e) first connector means connecting the outlet of said first tank means to said inlet through said first inlet valve;
   (f) second connector means connecting said outet of said second tank means to said inlet through said second inlet valve;
   (g) means for propelling said first and second materials from their respective tank means through said mixing chamber means and out of said mixing chamber outlet;
   (h) control means for simultaneously opening and closing said inlet valves;
   (i) third tank means for providing a supply of solvent for cleaning said mixing chamber means, said tank having an outlet;
   (j) third connector means connecting said outlet of said third tank means to the inlet of said mixing chamber means through said third inlet valve;
   (k) pump means in said third connector means interposed between said third tank means outlet and said third inlet valve to cause the flow of solvent through said mixing chamber means and out of said mixing chamber outlet when said inlet valve is opened, said pump means having an inlet and an outlet, fourth connector means for connecting said pump inlet to said third tank means outlet, and fifth connector means for connecting said pump outlet to said mixing chamber inlet and sixth connector means for connecting said pump cutlet to the interior of said third tank means ; and
   (1) means for recycling said solvent, after said solvent flows through said mixing chamber means and out of said mixing chamber outlet, back to said third tank means through said third tank inlet.

2. The apparatus of claim 1, further including a first check valve in said third connector means between said third inlet valve and said mixing chamber means inlet, and a second check valve in the sixth connector means , the operating pressure of said first check valve being less than the operating pressure of said second check valve.

3. A foam generating apparatus wherein first and second inter-reactive foam-forming materials are mixed and foam generated therefrom, which apparatus comprises:

(a) a first tank, having an outlet, for providing a supply of said first material;
(b) a second tank, having an outlet, for providing a supply of said second material;
(c) a foam gun head including a mixing chamber having an inlet and an outlet;
(d) first and second mixing chamber inlet valves in said foam gun head;
(e) means connecting the outlet of said first and second tank to the mixing chamber through said first and second inlet valves respectively;
(f) means on said foam gun head for simultaneously opening and closing said first and second inlet valves;
(g) a third tank, having an outlet, for providing a supply of solvent for cleaning said mixing chamber;
(h) a third mixing chamber inlet valve in said foam gun head;
(i) means connecting the outlet of said third tank to the mixing chamber through said third inlet valve;
(j) pump means in said means connecting the outlet of said third tank to said mixing chamber interposed between said third tank outlet and said third inlet valve to cause the flow of solvent through said mixing chamber when said inlet valve is opened wherein said pump means has an inlet and an outlet, means connecting said pump inlet to said third tank outlet, and means connecting said pump outlet to said third inlet valve and to the interior of said third tank; and
(k) means for recycling said solvent after flowing through said mixing chamber outlet back to said third tank through said third tank inlet.

4. The apparatus of claim 3, further including a first check valve in said foam gun head between said third inlet valve and said mixing chamber, and a second check valve in the means connecting said pump outlet to the interior of said third tank, the operating pressure of said first check valve being less than the operating pressure of said second check valve.

5. In a foam generating apparatus wherein at least two inter-reactive foam-forming materials are mixed to generate foam and dispense the generated foam through an outlet and wherein the apparatus is thereafter flushed, the improvement which comprises:
(a) mixing chamber means, having said outlet and first and second valve inlets, for mixing said materials;
(b) means for supplying said materials to said mixing chamber through said first and second mixing chamber inlet valves;
(c) means for opening and closing said first and second mixing chamber inlet valves;
(d) solvent storage means for storing said solvent;
(e) solvent supply means for selectively supplying said solvent from said solvent storage means to said mixing chamber through a solvent inlet valve;
(f) means for opening and closing said solvent inlet valve so as to allow solvent to flow through said mixing chamber and out of said outlet;
(g) solvent recycle means for recycling the solvent flowing out of said outlet back to said storage means when said solvent inlet valve is open;
(h) wherein said solvent recycle means includes inlet means, forming a part of said storage means, for allowing at least a portion of said mixing chamber means to be placed into said solvent storage means so as to permit solvent supplied to said mixing chamber means from said solvent storage means to flow from said mixing chamber means back into said solvent storage means to thereby recycle said solvent;
(i) said mixing chamber includes a nozzle member;
(j) said storage means includes a lid member; and
(k) said inlet means comprises a vertical passageway through said lid member, said passageway being adapted to receive said nozzle member in a vertical downward-pointing position to thereby minimize back flow through said opening.

6. The improvement of claim 5 wherein said nozzle member includes a flanged rearward portion adapted to rest atop a portion of said lid member surrounding said passageway.

7. A foam generating apparatus wherein first and second inter-reactive foam-forming materials are mixed and foam generated therefrom and the generated foam is dispensed through an outlet, which apparatus comprises:
(a) first tank means, having an outlet, for providing a supply of said first material;
(b) second tank means, having an outlet, for providing a supply of said second material;
(c) first, second and third inlet valves;
(d) mixing chamber means, having an inlet and an outlet for mixing said first and second materials to generate foam and dispensing said generated foam through said mixing chamber outlet;
(e) first connector means connecting the outlet of said first tank means to said inlet through said first inlet valve;
(f) second connector means connecting said outlet of said second tank means to said inlet through said second inlet valve;
(g) means for propelling said first and second materials from their respective tank means through said mixing chamber means and out of said mixing chamber outlet;
(h) control means for simultaneously opening and closing said inlet valves;
(i) third tank means for providing a supply of solvent for cleaning said mixing chamber means, said tank having an outlet;
(j) third connector means connecting said outlet of said third tank means to the inlet of said mixing chamber means through said third inlet valve;
(k) pump means in said third connector means interposed between said third tank means outlet and said third inlet valve to cause the flow of solvent through said mixing chamber means and out of said mixing chamber outlet when said inlet valve is opened;
(l) means for recycling said solvent, after said solvent flows through said mixing chamber means and out of said mixing chamber outlet, back to said third tank means through said third tank inlet;
(m) said solvent recycle means including inlet means, forming a part of said third tank means, for allowing at least a portion of said mixing chamber means to be placed into said third tank means so as to permit solvent supplied to said mixing chamber means from said third tank means to flow from said mixing chamber means back into said third tank means to thereby recycle said solvent;
(n) said mixing chamber means includes a nozzle member;
(o) said third tank means includes a lid member; and (p) said inlet means comprises a vertical passageway through said lid member, said passageway adapted to receive said nozzle member in a vertical downward-pointing position to thereby minimize backflow through said opening.

8. The improvement of claim 7 wherein said nozzle member includes a flanged rearward portion adapted to rest atop a portion of said lid member surrounding said passageway.

9. The improvement of claim 7, wherein said solvent storage means includes a second inlet, said improvement further comprises return piping means bypassing said mixing chamber, and connected to said second inlet, for allowing circulation of said solvent from said outlet of said third tank to said second inlet when at least one of said operating valve and said first and second mixing chamber inlet valves is closed.

10. A foam generating apparatus wherein first and second inter-reactive foam-forming materials are mixed and foam generated therefrom, which apparatus comprises:
   (a) a first tank, having an outlet for providing a supply of said first material;
   (b) a second tank, having an outlet, for providing a supply of said second material;
   (c) a mixing chamber having an inlet and an outlet;
   (d) first means connecting the outlet of said first tank to said inlet through a first inlet valve;
   (e) second means connecting the outlet of said second tank to said inlet through a second inlet valve;
   (f) third means for simultaneously opening or closing said inlet means;
   (g) fourth means for propelling said first and second materials from their respective tanks through said mixing chamber;
   (h) a third tank for providing a supply of solvent for cleaning said mixing chamber, said tank having a first inlet adapted to receive said outlet of said mixing chamber and an outlet;
   (i) an operating valve associated with said gun head for allowing and preventing solvent flow therethrough;
   (j) fifth means connecting said outlet of said third tank to the inlet of said mixing chamber through an operating valve;
   (k) sixth means, for causing flow of solvent through said mixing chamber when said operating valve is opened, said sixth means having an inlet connected to said third tank outlet and an outlet connected to said mixing chamber inlet and independently to the interior of said third tank, respectively; and
   (l) seventh means for allowing circulation of said solvent from said outlet of said mixing chamber through said mixing chamber to said first inlet of said third tank only when said first and second mixing chamber valves are closed and said mixing chamber outlet is placed within said first inlet of said third tank.

11. A foam generating apparatus wherein first and second inter-reactive foam-forming materials are mixed and foam generated therefrom, which apparatus comprises:
   (a) a first tank, having an outlet for providing a supply of said first material;
   (b) a second tank, having an outlet, for providing a supply of said second material;
   (c) a mixing chamber having an inlet and an outlet;
   (d) first means connecting the outlet of said first tank to said inlet through a first inlet valve;
   (e) second means connecting the outlet of said second tank to said inlet through a second inlet valve;
   (f) third means for simultaneously opening or closing said inlet means;
   (g) fourth means for propelling said first and second materials from their respective tanks through said mixing chamber;
   (h) a third tank for providing a supply of solvent for cleaning said mixing chamber, said tank having a first inlet adapted to receive said outlet of said mixing chamber and an outlet;
   (i) an operating valve associated with said gun head for allowing and preventing solvent flow therethrough;
   (j) fifth means connecting said outlet of said third tank to the inlet of said mixing chamber through an operating valve;
   (k) sixth means, for causing flow of solvent through said mixing chamber when said operating valve is opened, said sixth means having an inlet connected to said third tank outlet and an outlet connected to said mixing chamber inlet and independently to the interior of said third tank, respectively; and
   (l) a first check valve between said third inlet valve and said mixing chamber inlet, and a second check valve in the means connecting said pump outlet to the interior of said tank, the operating pressure of said first check valve being less than the operating pressure of said second check valve.

12. A foam generating apparatus wherein first and second inter-reactive foam-forming materials are mixed and foam generated therefrom, which apparatus comprises:
   (a) a first tank, having an outlet, for providing a supply of said first material;
   (b) a second tank, having an outlet, for providing a supply of said second material;
   (c) a foam gun head including a mixing chamber having an inlet and an outlet;
   (d) first and second mixing chamber inlet valves in said foam gun head;
   (e) means connecting the outlets of said first and second tanks to the mixing chamber through said first and second inlet valves, respectively;
   (f) means on said foam gun head for simultaneously opening or closing said first and second inlet valves;
   (g) means for propelling said first and second materials from their respective tanks through said mixing chamber;
   (h) a third tank, having an outlet, for providing a supply of solvent for cleaning said mixing chamber;
   (i) a third mixing chamber inlet valve in said foam gun head;
   (j) means connecting the outlet of said third tank to the mixing chamber through said third inlet valve;
   (k) sixth means for causing flow of solvent through said mixing chamber when said operating valve is opened, said sixth means having an inlet connected to said third tank outlet, and an outlet connected to said mixing chamber inlet and independently to the interior of said third tank, respectively;
   (l) means for allowing circulation of said solvent from said outlet of said mixing chamber through said mixing chamber to said first inlet of said third tank only when said first and second mixing chamber valves are closed and said mixing chamber outlet is placed within said first inlet of said third tank; and (m) a first check valve in said foam gun head between said third inlet valve and said mixing chamber, and a second check valve in the means connecting said pump outlet to the interior of said third tank, the operating pressure of said first check valve being less than the operating pressure of said second check valve.

* * * * *